US010127740B2

(12) United States Patent
Morita et al.

(10) Patent No.: US 10,127,740 B2
(45) Date of Patent: Nov. 13, 2018

(54) INSPECTION APPARATUS, INSPECTION SYSTEM, AND INSPECTION METHOD

(71) Applicant: HITACHI AUTOMOTIVE SYSTEMS, LTD., Hitachinaka-shi, Ibaraki (JP)

(72) Inventors: Nobuyoshi Morita, Tokyo (JP); Makoto Kayashima, Tokyo (JP); Keisuke Hakuta, Tokyo (JP); Toru Owada, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 49 days.

(21) Appl. No.: 15/308,954

(22) PCT Filed: Mar. 26, 2015

(86) PCT No.: PCT/JP2015/059500
§ 371 (c)(1),
(2) Date: Nov. 4, 2016

(87) PCT Pub. No.: WO2015/170526
PCT Pub. Date: Nov. 12, 2015

(65) Prior Publication Data
US 2017/0076516 A1    Mar. 16, 2017

(30) Foreign Application Priority Data

May 7, 2014    (JP) .................... 2014-096112

(51) Int. Cl.
*G07C 5/08*    (2006.01)
*B60R 16/02*    (2006.01)
(Continued)

(52) U.S. Cl.
CPC ............ *G07C 5/0808* (2013.01); *B60R 16/02* (2013.01); *G01M 17/007* (2013.01);
(Continued)

(58) Field of Classification Search
CPC ...... G07C 5/0808; G07C 5/008; B60R 16/02; G01M 17/007; G05B 23/0235; G06F 21/31
(Continued)

(56) References Cited

U.S. PATENT DOCUMENTS

2003/0009271 A1    1/2003  Akiyama
2007/0083304 A1    4/2007  Yamada
(Continued)

FOREIGN PATENT DOCUMENTS

CN    101030863 A        9/2007
JP    2003-019931   *    1/2003
(Continued)

OTHER PUBLICATIONS

International Search Report of PCT/JP2015/059500 dated Jun. 9, 2015.
(Continued)

*Primary Examiner* — Muhammad Shafi
(74) *Attorney, Agent, or Firm* — Mattingly & Malur, PC

(57) ABSTRACT

There are provided an inspection apparatus, an inspection system, and an inspection method capable of inspecting operation of a control device, accurately, during use.
An inspection apparatus configured to inspect operation of an ECU coupled to automotive networks, includes an inspection performance control unit configured to transmit two pieces of data including operation-inspection data and security-check data used for inspecting the operation of the ECU, to the ECU, and configured to receive data output from the ECU. The operation-inspection data is data previously generated based on design information of the ECU. The security-check data is data including part or entirety of the operation-inspection data replaced with random data.

13 Claims, 16 Drawing Sheets

(51) Int. Cl.
  *G01M 17/007* (2006.01)
  *G06F 21/31* (2013.01)
  *G07C 5/00* (2006.01)
  *G05B 23/02* (2006.01)
  *B60W 50/02* (2012.01)

(52) U.S. Cl.
  CPC ......... *G05B 23/0235* (2013.01); *G06F 21/31* (2013.01); *G07C 5/008* (2013.01); *B60W 50/02* (2013.01)

(58) Field of Classification Search
  USPC ........................................................ 701/31.4
  See application file for complete search history.

(56) References Cited

U.S. PATENT DOCUMENTS

2010/0269153 A1* 10/2010 Kato ................. G06F 21/31
                                                              726/3
2013/0282227 A1   10/2013 Chen et al.

FOREIGN PATENT DOCUMENTS

| JP | 2003-019931 A | 1/2003 |
| JP | 2005-44309 A  | 2/2005 |
| JP | 2007-099145 A | 4/2007 |
| JP | 4622177 B2    | 2/2011 |

OTHER PUBLICATIONS

Extended European Search Report received in corresponding European Application No. 15788801.7 dated Dec. 1, 2017.

* cited by examiner

FIG. 2

USER INFORMATION 271

| USER ID | USER PASS | USER NAME |
|---|---|---|
| aaa.bbb@kk.com | $1$wpkFeWyW$dRnpRo1XDyGJQkc1I M3CT1 | TARO HITACHI |
| sslekk.cc@ew.com | $1$aSSAIoce$9LHlYnpmdW9mx3YK9 0jIC1 | HANAKO HITACHI |
| ... | ... | ... |

OBJECT-TO-BE-INSPECTED VEHICLE INFORMATION 272

| USER ID | VIN | MAKER | MODEL | COLOR | VEHICLE NUMBER |
|---|---|---|---|---|---|
| aaa.bbb@kk.com | 1FALP45D9RF158493 | MAKER A | MODEL A | BLUE | TOKUSHIMA 500-KA 08-73 |
| ... | ... | ... | ... | ... | ... |
| sslekk.cc@ew.com | 1HD1CAP1APY999FE9 | MAKER B | MODEL B | WHITE | SHINAGAWA 500-HA 34-55 |
| ... | ... | ... | ... | ... | ... |

OBJECT-TO-BE-INSPECTED ECU INFORMATION 273

| MODEL | ECU-ID | ECU NAME | OBJECT-TO-BE-INSPECTED FLAG | INSPECTION PERIOD | CAN-ID |
|---|---|---|---|---|---|
| MODEL A | ECU-1 | ENGINE ECU | TARGET | {2014/02/20/0:00, 2014/02/27/23:59} | {0x3C4, 0xA30, ...} |
| MODEL A | ECU-2 | AUDIO ECU | NON-TARGET | {−, −} | ... |
| MODEL A | ECU-3 | BRAKE ECU | TARGET | {2014/02/10/0:00, 2014/02/18/23:59} | ... |
| ... | ... | ... | ... | ... | ... |

SECURITY-CHECK DATA INFORMATION 274

| INSPECTION ID | ECU-ID | CAN-ID | INSPECTION DATA |
|---|---|---|---|
| ST-1 | ECU-1 | 0x7E0 | {0x1DC320､ ･･･} |
|  |  | 0x7E8 | {0x1FA220､ ･･･} |
|  |  | ･･･ | ･･･ |
| ST-2 | ECU-3 | ･･･ | ･･･ |
| ･･･ | ･･･ | ･･･ | ･･･ |

OPERATION-INSPECTION DATA INFORMATION 275

| INSPECTION ID | ECU-ID | CAN-ID | INSPECTION DATA |
|---|---|---|---|
| OT-1 | ECU-1 | 0x7E0 | {0x2B3CF0､ ･･･} |
|  |  | 0x7E8 | {0x1A3DE0､ ･･･} |
|  |  | ･･･ | ･･･ |
| OT-2 | ECU-3 | ･･･ | ･･･ |
| ･･･ | ･･･ | ･･･ | ･･･ |

SCHEDULE INFORMATION 276

| VIN | DATE AND TIME | INSPECTION ID |
|---|---|---|
| 1FALP45D9RF158493 | 2014/02/20/20:00 | {OT-1､ST-1} |
| 1HD1CAP1APY999FE9 | 2014/02/24/23:00 | {OT-2､ST-2} |
| ･･･ | ･･･ | ･･･ |

FIELD STRUCTURE INFORMATION 277

| MODEL | CAN-ID | DETAILED FIELD ID | SEGMENT ID | BIT NUMBER |
|---|---|---|---|---|
| MODEL A | 0x7E0 | A1 | D1 | 8bit |
| MODEL A | 0x7E0 | A2 | D2 | 8bit |
| MODEL A | 0x7E0 | A3 | D2 | 16bit |
| MODEL A | 0x7E0 | A4 | D4 | 32bit |
| MODEL A | 0x9C0 | A1 | D1 | 8bit |
| ... | ... | ... | ... | ... |

FIELD SEGMENT INFORMATION 278

| SEGMENT ID | SEGMENT NAME |
|---|---|
| D1 | SIGNIFICANT DIGITS |
| D2 | VARIABLE DATA |
| D3 | RESERVATION |
| D4 | DUMMY |
| D5 | CHECKSUMS |
| ... | ... |

FIELD DEPENDENCE INFORMATION 279

| MODEL | CAN-ID | DETAILED FIELD DEPENDENCE |
|---|---|---|
| MODEL A | 0x7E0 | {A1、(A2&A3)、A4} |
| MODEL A | 0x9C0 | {A1,···} |
| ... | ... | ... |

INSPECTION RESULT INFORMATION 280

| VIN | INSPECTION RESULT | PERFORMANCE INSPECTION ID |
|---|---|---|
| 1FALP45D9RF158493 | aaa.log | {OT-1、ST-1} |
| 1HD1CAP1APY999FE9 | bbb.log | {OT-2、ST-2} |
| ... | ... | ... |

INSPECTION COLLATION RESULT INFORMATION 281

| MODEL | CAN-ID | PERFORMANCE INSPECTION DATA | ESTIMATE OUTPUT DATA | DETERMINATION RESULT |
|---|---|---|---|---|
| MODEL A | 0x7E0 | {0x1DC320、...} | 0x102DF583C34A5B0003A023C1010 | NO ABNORMALITY |
| MODEL A | 0x7E8 | {0x1FA220、...} | 0x1C347BA3C3920D5183ACBAC0F13 | NO ABNORMALITY |
| ... | ... | ... | ... | ... |

INSPECTION PERFORMANCE DATA INFORMATION 1161

| PERFORMANCE ORDER | INSPECTION ID | CAN-ID | INSPECTION DATA | PROGRESS |
|---|---|---|---|---|
| 1 | OT-1 | 0x7E0 | {0x1DC320、...} | COMPLETION |
| 2 | OT-1 | 0x7E8 | {0x1FA220、...} | — |
| ... | ... | ... | ... | ... |

INSPECTION PERFORMANCE RESULT INFORMATION 1162

| INSPECTION ID | INSPECTION RESULT |
|---|---|
| {OT-1、ST-1} | aaa.log |
| ... | ... |

11621     11622

INSPECTION APPARATUS, INSPECTION SYSTEM, AND INSPECTION METHOD

TECHNICAL FIELD

The present invention relates to an inspection apparatus, an inspection system, and an inspection method that inspect operation of a control device with which a motor vehicle has been equipped. In particular, the invention is suitable for applying to an inspection apparatus, an inspection system, and an inspection method that inspect operation of a control device coupled to automotive networks.

BACKGROUND ART

Recently, a technique of coupling a plurality of control devices (electronic control units: ECUs) with which a motor vehicle has been equipped, to automotive networks (controller area network: CAN) and operating the plurality of control devices in cooperation with each other through the automotive networks, has been developed.

Examples of the plurality of ECUs include an engine ECU that performs control of an engine, a transmission ECU that performs control of shift changing, and a brake ECU that adjusts brake oil pressure. PTL 1 discloses a technique of determining a defect of cooperating operation and specifying a failure area in a case where the plurality of ECUs operates in cooperation with each other.

In particular, PTL 1 discloses a failure diagnosis system including a defect determining means configured to determine occurrence of the defect due to the cooperating operation, based on data transmitted and received between the ECUs through automotive networks, a program acquisition means configured to acquire an inspection diagnosis program previously prepared in correspondence to the defect when the occurrence of the defect is determined, and a failure area specifying means configured to perform the inspection diagnosis program so as to perform corresponding processing to the ECUs, and configured to specify the failure area based on information transmitted from the ECUs by the performance of the corresponding processing.

CITATION LIST

Patent Literature

PTL 1: JP 4622177 B2

SUMMARY OF INVENTION

Technical Problem

However, the failure diagnosis system described in PTL 1 specifies the failure area, using the previously prepared inspection diagnosis program. The inspection diagnosis program is a program previously generated before use, based on design information on the ECUs. Thus, it cannot be determined whether the ECUs properly operate in a case where data not assumed at a design stage, is transmitted to the ECUs during the use.

That is, a failure can be specified about the failure (a malfunction). However, it cannot be accurately determined whether the operation being performed is normal or abnormal.

The present invention has been made in consideration of the above point. An object of the present invention is to propose an inspection apparatus, an inspection system, and an inspection method capable of inspecting operation of an ECU accurately during use.

Solution to Problem

In order to solve the above problem, the inspection apparatus according to the present invention includes: an inspection performance control unit configured to transmit two pieces of data including operation-inspection data and security-check data used for inspecting operation of an ECU, to the ECU, and configured to receive data output from the ECU. The operation-inspection data is data previously generated based on design information of the ECU. The security-check data is data including part or entirety of the operation-inspection data replaced with random data.

In order to solve the above problem, an inspection system according to the present invention, includes: a service providing server including: an inspection plan unit configured to plan a schedule for inspecting operation of an ECU; an inspection data generation unit configured to generate two pieces of data including operation-inspection data and security-check data used for inspecting the operation of the ECU; and an inspection control unit configured to transmit the generated two pieces of data to an exterior in accordance with the planned schedule; and a gateway configured to transmit, in a case where the two pieces of data including the operation-inspection data and the security-check data transmitted from the service providing server, are received, the received two pieces of data to the ECU, the gateway configured to transmit, in a case where data output from the ECU is received, inspection performance result information including the received data to the service providing server. The operation-inspection data is data previously generated based on design information of the ECU. The security-check data is data including part or entirety of the operation-inspection data replaced with random data.

In order to solve the problem, an inspection method according to the present invention, includes: a first step of planning a schedule for inspecting operation of an ECU, by an inspection plan unit; a second step of generating two pieces of data including operation-inspection data and security-check data used for inspecting the operation of the ECU, by an inspection data generation unit; a third step of transmitting the generated two pieces of data to an exterior, by an inspection control unit, in accordance with the planned schedule; and a fourth step of transmitting by a gateway, in a case where the two pieces of data including the operation-inspection data and the security-check data transmitted from a service providing server, are received, the received two pieces of data to the ECU, and in a case where data output from the ECU is received, inspection performance result information including the received data to the service providing server. The operation-inspection data is data previously generated based on design information of the ECU. The security-check data is data including part or entirety of the operation-inspection data replaced with random data.

Advantageous Effects of Invention

According to the present invention, the operation of the ECU during the use can be accurately inspected.

BRIEF DESCRIPTION OF DRAWINGS

FIG. 2 is a table of a logical configuration of user information.

FIG. 3 is a table of a logical configuration of object-to-be-inspected vehicle information.

FIG. 4 is a table of a logical configuration of object-to-be-inspected ECU information.

FIG. 5 is a table of a logical configuration of security-check data information.

FIG. 6 is a table of a logical configuration of operation-inspection data information.

FIG. 7 is a table of a logical configuration of schedule information.

FIG. 8 is a table of a logical configuration of field structure information.

FIG. 9 is a table of a logical configuration of field segment information.

FIG. 10 is a table of a logical configuration of field dependence information.

FIG. 11 is a table of a logical configuration of inspection result information.

FIG. 12 is a table of a logical configuration of inspection collation result information.

FIG. 13 is a table of a logical configuration of inspection performance data information.

FIG. 14 is a table of a logical configuration of inspection performance result information.

DESCRIPTION OF EMBODIMENTS

One embodiment of the present invention will be described below for the drawings.

(1) Entire Configuration

Figure 1:
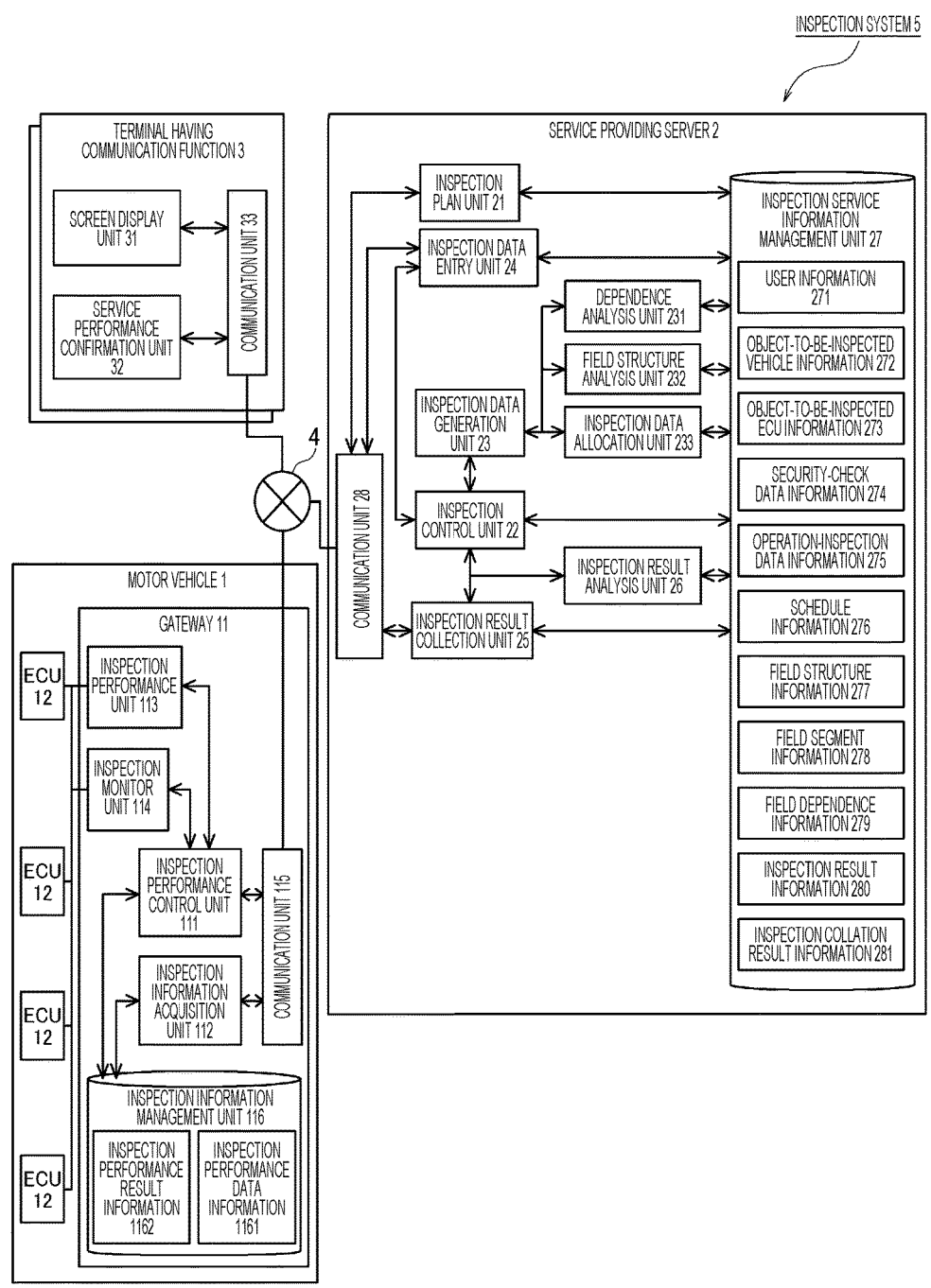
FIG. 1 is a block diagram of an entire configuration of an inspection system according to the present embodiment.

FIG. 1 illustrates an entire configuration of an inspection system 5 according to the present embodiment. The inspection system 5 is configured with a motor vehicle 1, a service providing server 2, and a terminal having a communication function 3. The motor vehicle 1, the service providing server 2, and the terminal having a communication function 3 are coupled so as to be communicable to each other through a communication network 4. The communication network 4 is, for example, a mobile phone network or a wireless local area network (LAN).

The motor vehicle 1 is configured with a gateway 11 and a plurality of electronic control units (ECUs) 12. The gateway 11 and each of the ECUs 12 are coupled through automotive networks referred to as a controller area network (CAN).

The gateway 11 here is a terminal that functions as an inspection apparatus. The gateway 11 is configured with an inspection performance control unit 111, an inspection information acquisition unit 112, an inspection performance unit 113, an inspection monitor unit 114, a communication unit 115, and an inspection information management unit 116.

The inspection performance control unit 111 stores an inspection performance data information 1161 received through the communication unit 115, in the inspection information management unit 116, and also acquires and transmits the inspection performance data information 1161 stored in the inspection information management unit 116, to the ECUs 12. The inspection performance data information 1161 includes operation-inspection data and security-check data.

The operation-inspection data is test data of the ECUs 12 to be previously generated at a design stage based on design information. The details will be given later (refer to FIG. 6). The security-check data is test data for inspecting and diagnosing whether operation of the ECUs 12 is normal or abnormal during actual use. The details will be given later (refer to FIG. 5). Note that, these pieces of data are collectively referred to as inspection data in some cases.

The inspection information acquisition unit 112 acquires inspection performance result information 1162 stored in the inspection information management unit 116, and transmits the inspection performance result information 1162 to the service providing server 2 through the communication unit 115. The inspection performance unit 113 transmits the operation-inspection data and the security-check data to the ECUs 12 based on an inspection performance request from the inspection performance control unit 111.

The inspection monitor unit 114 monitors and acquires data output from the ECUs 12 based on the operation-inspection data and the security-check data, and stores the acquired data as the inspection performance result information 1162 in the inspection information management unit 116.

The ECUs 12 are control devices that control various types of instruments included in the motor vehicle 1. Examples of the ECUs 12 include an engine ECU that performs control of an engine, a transmission ECU that performs control of shift changing, and a brake ECU that adjusts brake oil pressure.

The service providing server 2 is configured with an inspection plan unit 21, an inspection control unit 22, an inspection data generation unit 23, a dependence analysis unit 231, a field structure analysis unit 232, an inspection data allocation unit 233, an inspection data entry unit 24, an inspection result collection unit 25, an inspection result analysis unit 26, and an inspection service information management unit 27.

The inspection plan unit 21 plans a schedule of an inspection to be performed to the ECUs 12, transmits the planned schedule to the terminal having a communication function 3 owned by a user of the motor vehicle 1, receives the schedule approved in the terminal having a communication function 3, and stores the schedule in the inspection service information management unit 27.

The inspection control unit 22 collectively controls operation of the inspection data generation unit 23, the inspection data entry unit 24, the inspection result collection unit 25, and the inspection result analysis unit 26.

The inspection data generation unit 23 generates the security-check data, using the dependence analysis unit 231, the field structure analysis unit 232, and the inspection data allocation unit 233, and stores the generated security-check data in the inspection service information management unit 27.

The inspection data entry unit 24 transmits a notification for performing an inspection, to the terminal having a communication function 3 owned by the user of the motor vehicle 1, acquires the security-check data and the operation-inspection data from the inspection service information management unit 27, and transmits the pieces of data to the motor vehicle 1 being an object to be inspected.

When receiving an inspection completion notification from the gateway 11, the inspection result collection unit 25 transmits a collection request for the inspection performance result information 1162 to the gateway 11, and stores the inspection performance result information 1162 collected from the gateway 11, in the inspection service information management unit 27.

The inspection result analysis unit 26 acquires inspection result information 280 and inspection collation result information 281 from the inspection service information management unit 27, and compares both of the pieces of information so as to analyze whether a signal output from the ECUs 12 is normal or abnormal.

The inspection service information management unit 27 includes various types of information (271 to 281) necessary for operation of the service providing server 2. The details of the various types of information will be described later (refer to FIGS. 2 to 14).

The terminal having a communication function 3 is configured with a screen display unit 31, a service performance confirmation unit 32, and a communication unit 33. The screen display unit 31 displays the schedule of the inspection planned by the service providing server 2, on a display screen, and also displays an inspection result analyzed by the service providing server 2, on the display screen. The service performance confirmation unit 32 performs editing and approval processing for the schedule of the inspection displayed on the display screen.

(2) Table Configuration

The various types of information stored in the inspection service information management unit 27 of the service providing server 2 will be described with reference to FIGS. 2 to 12.

FIG. 2 illustrates a logical configuration of user information 271. The user information 271 is configured with a user ID column 2711, a user PASS column 2712, and a user name column 2713. The user ID column 2711 stores identification information of a user who uses the inspection system 5. The user PASS column 2712 stores a password of the user. The user name column 2713 stores a user name.

FIG. 3 illustrates a logical configuration of object-to-be-inspected vehicle information 272. The object-to-be-inspected vehicle information 272 is configured with a user ID column 2721, a vehicle identification number (VIN) column 2722, a maker column 2723, a model column 2724, a color column 2725, and a vehicle number column 2726.

The user ID column 2721 stores the identification information of the user. The VIN column 2722 stores identification information for identifying the motor vehicle 1 being the object to be inspected. The maker column 2723 stores a maker name of the motor vehicle 1. The model column 2724 stores a model of the motor vehicle 1. The color column 2725 stores a color of the motor vehicle 1. The vehicle number column 2726 stores a vehicle number of the motor vehicle 1.

FIG. 4 illustrates a logical configuration of object-to-be-inspected ECU information 273. The object-to-be-inspected ECU information 273 is configured with a model column 2731, an ECU-ID column 2732, an ECU name column 2733, an-object-to-be-inspected flag column 2734, an inspection period column 2735, and a CAN-ID column 2736.

The model column 2731 stores the model of the motor vehicle 1 being the object to be inspected. The ECU-ID column 2732 stores identification information for identifying the ECUs 12 being objects to be inspected. The ECU name column 2733 stores an ECU name. The object-to-be-inspected flag column 2734 stores information of whether the ECUs 12 are objects to be inspected, and, for example, stores "target" or "non-target".

The inspection period column 2735 stores an inspection period. The CAN-ID column 2736 stores identification information of the CAN to which ECUs 12 being the objects to be inspected, have been coupled.

FIG. 5 illustrates a logical configuration of security-check data information 274. The security-check data information 274 is configured with an inspection ID column 2741, an ECU-ID column 2742, a CAN-ID column 2743, and an inspection data column 2744.

The inspection ID column 2741 stores identification information for identifying an inspection with security-check data allocated to each of the ECUs 12 being the objects to be inspected. The ECU-ID column 2742 stores identification information for identifying the ECUs 12 to be objects to be inspected with the security-check data.

The CAN-ID column 2743 stores identification information of the CAN to which the ECUs 12 being the objects to be inspected have been coupled. The inspection data column 2744 stores inspection data and stores, for example, data corresponding to a data field of a CAN protocol.

FIG. 6 illustrates a logical configuration of operation-inspection data information 275. The operation-inspection data information 275 is configured with an inspection ID column 2751, an ECU-ID column 2752, a CAN-ID column 2753, and an inspection data column 2754, similarly to the security-check data information 274.

The inspection ID column 2751 stores identification information for identifying an inspection with the operation-inspection data allocated to each of the ECUs 12 being the objects to be inspected. The ECU-ID column 2752 stores identification information for identifying the ECUs 12 to be objects to be inspected with the operation-inspection data.

The CAN-ID column 2753 stores the identification information of the CAN to which the ECUs 12 being the objects to be inspected have been coupled. The inspection data column 2754 stores inspection data and stores, for example, data corresponding to a data field of a CAN protocol.

FIG. 7 illustrates a logical configuration of schedule information 276. The schedule information 276 is configured with a VIN column 2761, a date-and-time column 2762, and an inspection ID column 2763. The VIN column 2761 stores the identification information for identifying the motor vehicle 1 being the object to be inspected.

The date-and-time column 2762 stores an inspection date and time approved by the user of the motor vehicle 1 being the object to be inspected. The inspection ID column 2763 stores identification information for identifying the inspection to be performed to the motor vehicle 1.

FIG. 8 illustrates a logical configuration of field structure information 277. The field structure information 277 is configured with a model column 2771, a CAN-ID column 2772, a detailed field ID column 2773, a segment ID column 2774, and a bit number column 2775.

The model column 2771 stores the model of the motor vehicle 1 being the object to be inspected. The CAN-ID column 2772 stores the identification information of the CAN to which the ECUs 12 being the objects to be inspected have been coupled.

The detailed field ID column 2773 stores identification information for identifying a segment having a meaning in which the data field of the CAN protocol has been classified in more detail, based on design information of applications of the ECUs 12. The segment ID column 2774 stores identification information for identifying a meaning included in data, based on the design information of the applications of the ECUs 12.

For example, the segment ID column 2774 stores an eigenvalue for identifying a segment of "significant digits, variable data, reservation data, dummy data, or checksums". The bit number column 2775 stores the number of bits allocated to detailed field ID.

FIG. 9 illustrates a logical configuration of field segment information 278. The field segment information 278 is configured with a segment ID column 2781 and a segment name column 2782. The segment ID column 2781 stores identification information for identifying a type of data to be used in the data field of the CAN protocol.

The segment name column 2782 stores a name of the type of data to be used in the data field of the CAN protocol, the name of the type of data corresponding to segment ID. The name of the type of data may be segmented into, for example, "significant digits, variable data, reservation data, dummy data, or checksums".

FIG. 10 illustrates a logical configuration of field dependence information 279. The field dependence information 279 is configured with a model column 2791, a CAN-ID column 2792, and a detailed field dependence column 2793. The model column 2791 stores the identification information of the motor vehicle 1 being the object to be inspected. The CAN-ID column 2792 stores the identification information of the CAN to which the ECUs 12 being the objects to be inspected have been coupled.

The detailed field dependence column 2793 stores information indicating processing dependence of the detailed field ID (refer to FIG. 8) in the applications of the ECUs 12, based on, for example, away to be used as a condition of branch processing or an argument of a function call in the design information of the applications of the ECUs 12. For example, in a case where there is dependence between A1 and A2 in the detailed field ID (refer to FIG. 8), "A1 & A2" is stored with "&".

FIG. 11 illustrates a logical configuration of the inspection result information 280. The inspection result information 280 is configured with a VIN column 2801, an inspection result column 2802, and performance inspection ID column 2803. The VIN column 2801 stores the identification information for identifying the motor vehicle 1 being the object to be inspected. The inspection result column 2802 stores a result of the inspection that has been performed, as a log file. The performance inspection ID column 2803 stores identification information for identifying the inspection performed to the motor vehicle 1.

FIG. 12 illustrates a logical configuration of the inspection collation result information 281. The inspection collation result information 281 is configured with a model column 2811, a CAN-ID column 2812, a performance inspection data column 2813, an estimate output data column 2814, and a determination result column 2815.

The model column 2811 stores the model of the motor vehicle 1 being the object to be inspected. The CAN-ID column 2812 stores the identification information of the CAN to which the ECUs 12 being the objects to be inspected have been coupled.

The performance inspection data column 2813 stores inspection data transmitted to the ECUs 12. The estimate output data column 2814 stores data estimated to be output by the ECUs 12 based on a result of the transmission of the performed inspection data to the ECUs 12.

The determination result column 2815 stores a result determined by comparing the estimate output data and output data being stored in the log file of the inspection result (refer to FIG. 11). For example, in a case where the output data is within a range of the estimate output data, "no abnormality" is stored. In a case where the output data is out of the range of the estimate output data, "abnormality" is stored.

Next, the various types of information stored in the inspection information management unit 116 of the motor vehicle 1, will be described with reference to FIGS. 13 and 14.

FIG. 13 illustrates a logical configuration of the inspection performance data information 1161. The inspection performance data information 1161 is configured with a performance order column 11611, an inspection ID column 11612, a CAN-ID column 11613, an inspection data column 11614, and a progress column 11615.

The performance order column 11611 stores order in which inspection data stored in the inspection data column 11614 is transmitted to the ECUs 12. The inspection ID column 11612 stores identification information for identifying the operation-inspection data or the security-check data in association with each of the ECUs 12.

The CAN-ID column 11613 stores the identification information of the CAN to which the ECUs 12 being the objects to be inspected have been coupled. The inspection data column 11614 stores the inspection data (the operation-inspection data or the security-check data) to be transmitted to the ECUs 12.

The progress column 11615 stores information of whether the inspection using the inspection data stored in the inspection data column 11614 has been completed. For example, "completion" is stored with timing with which the inspection data is transmitted to the ECUs 12 and data output from the ECUs 12 is acquired.

FIG. 14 illustrates a logical configuration of the inspection performance result information 1162. The inspection performance result information 1162 is configured with an inspection ID column 11621 and an inspection result column 11622. The inspection ID column 11621 stores identification information for identifying the operation-inspection data or the security-check data in association with each of the ECUs 12.

The inspection result column 11622 stores the data output from the ECUs 12 after the inspection performance unit 113 transmits the inspection data stored in the inspection data column 11614 to the ECUs 12. For example, a log file including "a date, the inspection data transmitted to the ECUs 12, and the data output from the ECUs 12", recorded therein, is stored.

(3) Data Structure

Figure 15:
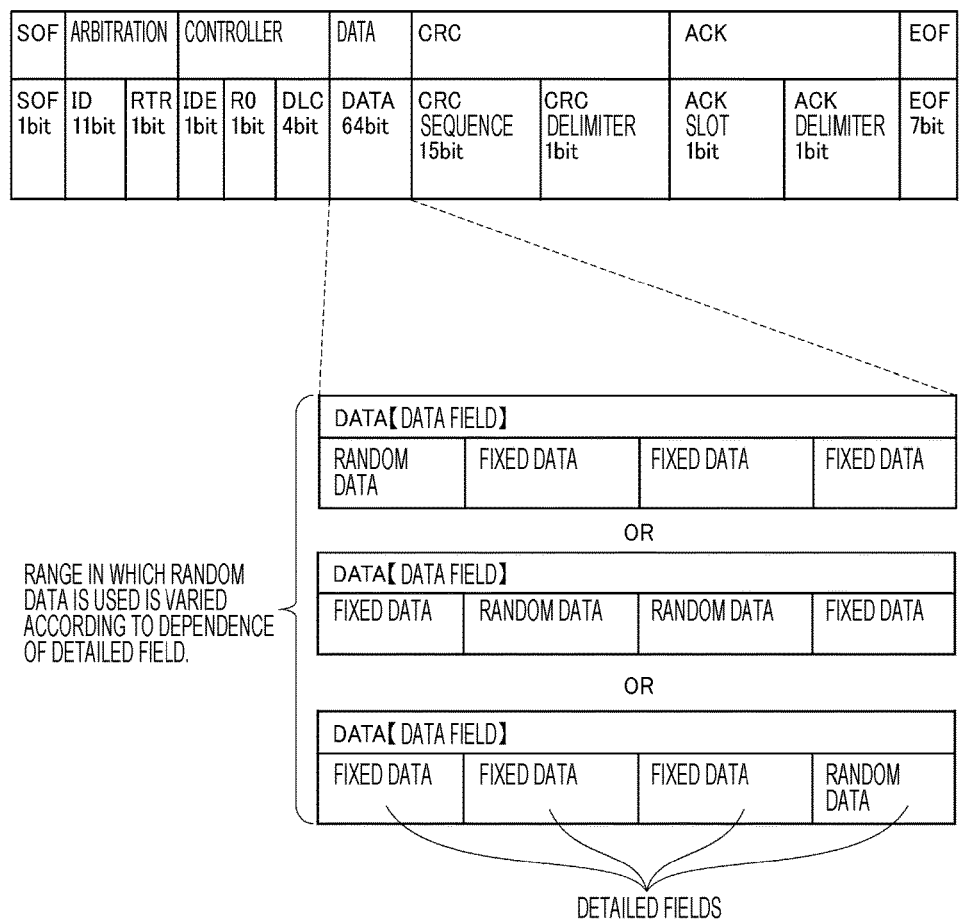
FIG. 15 is a table of a configuration of a data frame structure.

FIG. 15 illustrates a data frame structure. The data frame structure is stipulated with ISO15031 of the international organization for standardization.

A start of frame (SOF) field is a field that indicates a start of a data frame. An arbitration field is configured with ID (an identifier) indicating a destination, and a remote transmission request (RTR). The arbitration field is a field that indicates priority of the frame. A controller field is a field that indicates a reservation bit and the number of bytes of data.

Note that, the ID included in the arbitration field is CAN-ID according to the present embodiment. The CAN-ID determines a structure (segments) of the data field to be described later.

The data field is a field that stores a data body. According to the present embodiment, random data is stored in a part of the data field or the entirety thereof so that the security-check data is generated. Note that, the security-check data is generated by the inspection data generation unit 23 of the service providing server 2.

Details of generation processing of the security-check data will be described later (refer to FIG. 24). Here, with the simple descriptions, the inspection data generation unit 23 first analyzes the structure (the segments) of the data field, and acquires, for example, an analysis result indicating four segments. Next, dependence of each of the segments is analyzed. Finally, based on the dependence, the random data is stored in any of segments having proper inspection efficiency, and then the security-check data is generated.

A CRC field is a field that checks an error of the data frame. An ACK field is a field that indicates a sign of confirmation of reception that has been correctly made. An end of frame (EOF) field is a field that indicates an end of the data frame.

(4) Screen Configuration

Figure 16:
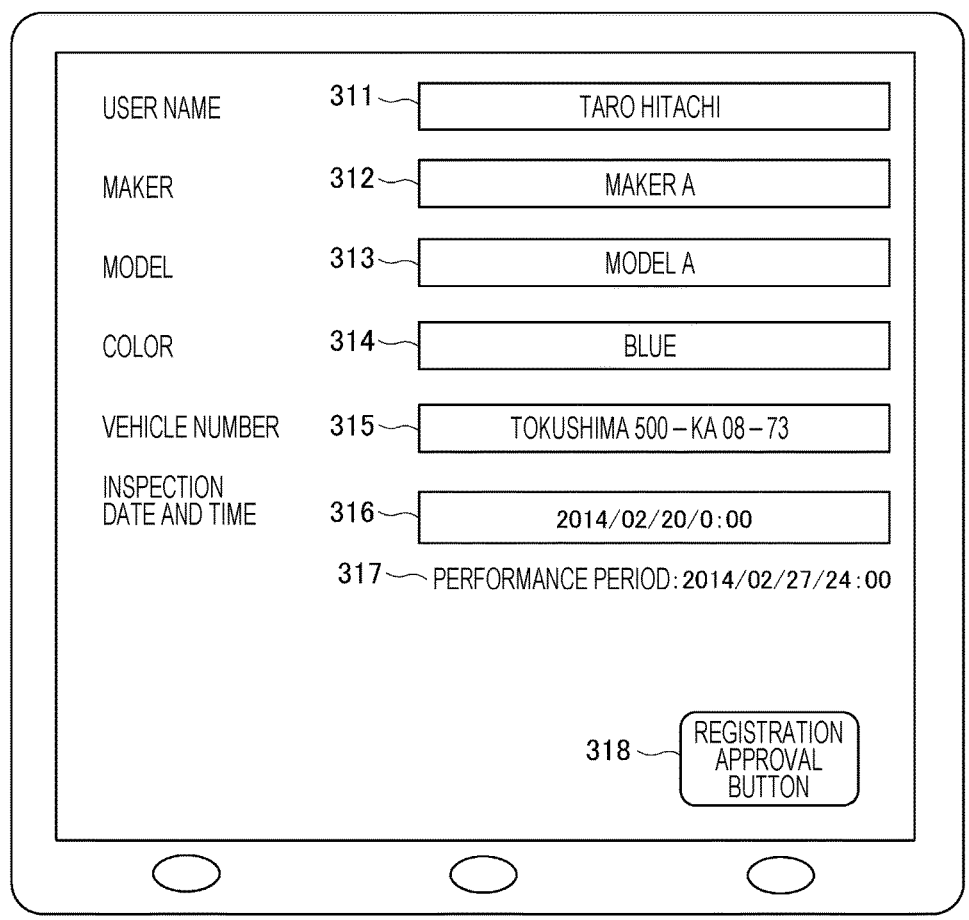
FIG. 16 is a view of a screen configuration of a schedule approval screen.

FIG. 16 illustrates a screen configuration displayed by the screen display unit 31 of the terminal having a communication function 3. The screen is a screen upon editing or approval in the terminal having a communication function 3 in a case where the service providing server 2 has transmitted the schedule of the inspection to the terminal having a communication function 3.

A user name region 311 displays a user name registered as the user of the motor vehicle 1 being the object to be inspected. The user name is acquired from the user name stored in the user name column 2713. A maker region 312 displays the maker name of the motor vehicle 1 being the object to be inspected. The maker name is acquired from the maker name stored in the maker column 2723.

A model region 313 displays the model of the motor vehicle 1 being the object to be inspected. The model is acquired from the model stored in the model column 2724. A color region 314 displays the color of the motor vehicle 1 being the object to be inspected. The color is acquired from the color stored in the color column 2725. A vehicle number region 315 displays the vehicle number of the motor vehicle 1 being the object to be inspected. The vehicle number is acquired from the vehicle number stored in the vehicle number column 2726.

An inspection date and time region 316 displays the schedule prepared by the inspection plan unit 21, to be editable. A performance period region 317 displays an inspection period. The inspection period is acquired from the inspection period stored in the inspection period column 2735. A registration approval button 318 is a button to be pressed upon approving the inspection to be performed at the inspection date and time displayed on the inspection day and time region 316.

(5) Flow Charts

Figure 17:
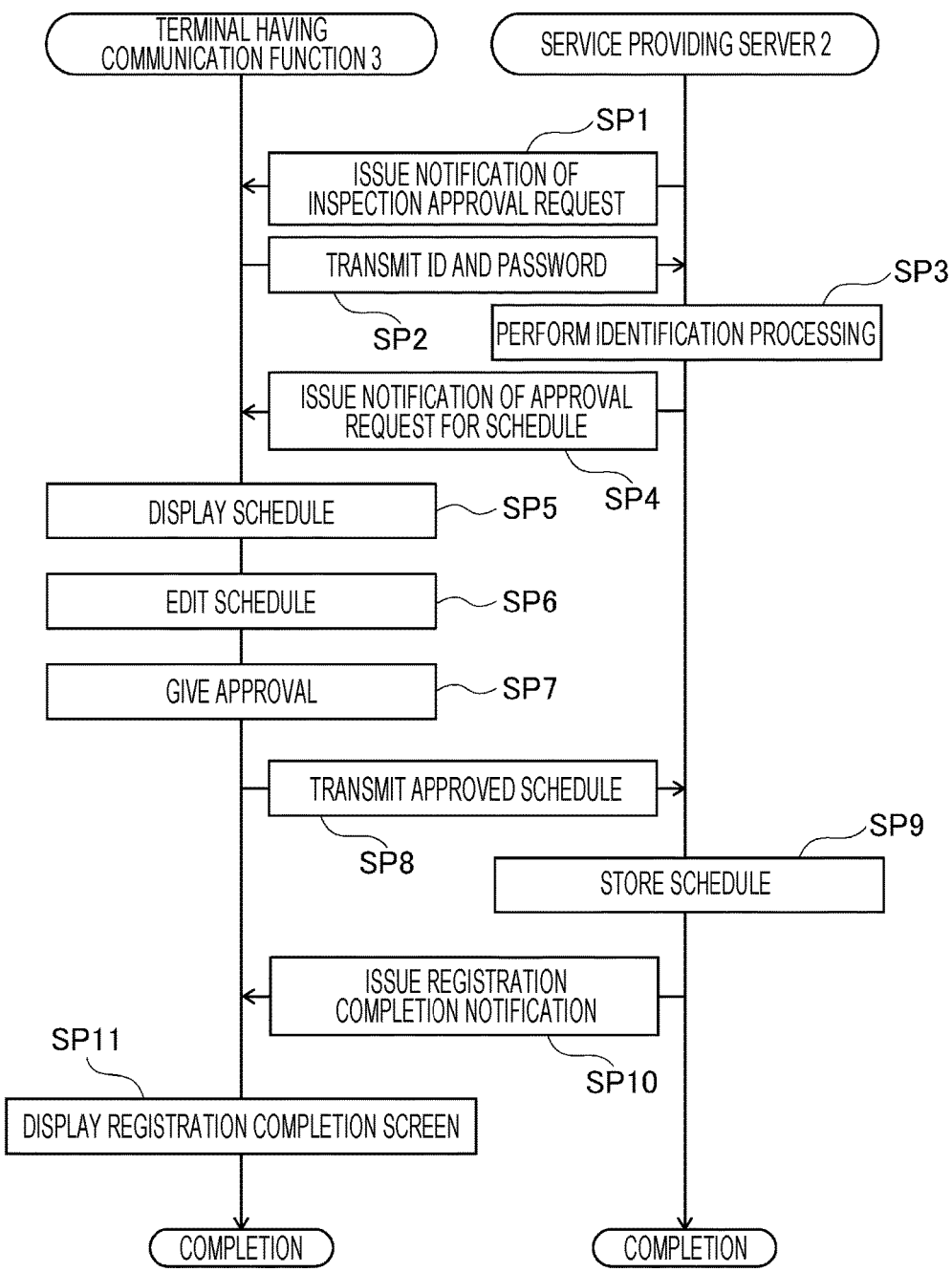
FIG. 17 is a flow chart of schedule registration processing.

FIG. 17 illustrates processing steps of schedule registration processing. The schedule registration processing is performed by the service providing server 2 and the terminal having a communication function 3.

First, the inspection plan unit 21 of the service providing server 2 transmits a notification of an inspection approval request (SP1). The notification of the inspection approval request is a notification for requesting transmission of ID and a password. When receiving the notification of the inspection approval request, the service performance confirmation unit 32 of the terminal having a communication function 3 transmits the ID and the password input by the user, to the service providing server 2 (SP2).

Next, when receiving the ID and the password, the inspection plan unit 21 refers to the user information 271 and then performs identification processing of the ID and the password (SP3). When the identification processing identifies the ID and the password, the inspection plan unit 21 refers to the object-to-be-inspected vehicle information 272 and the object-to-be-inspected ECU information 273, prepares one inspection schedule or a plurality of inspection schedules, and transmits a notification of an approval request for the prepared one schedule or the prepared plurality of schedules, to the terminal having a communication function 3 (SP4).

The notification of the approval request for the one schedule or the plurality of schedules, is a notification for instructing displaying of the one schedule or the plurality of schedules together with the various types of information included in the user information 271, the object-to-be-inspected vehicle information 272, and the object-to-be-inspected ECU information 273. When receiving the notification of the approval request for the one schedule or the plurality of schedules, the screen display unit 31 displays the one schedule or the plurality of schedules together with the various types of information included in the notification, on the display screen (SP5). Note that, the display screen to be displayed is the display screen described in FIG. 16.

After editing the one schedule or the plurality of schedules as necessary (SP6), the service performance confirmation unit 32 approves the one schedule or the plurality of schedules by the press of the registration approval button 318 (SP7). The service performance confirmation unit 32 transmits the approved one schedule or the approved plurality of schedules, to the service providing server 2 (SP8). When receiving the one schedule or the plurality of schedules from the terminal having a communication function 3, the inspection plan unit 21 stores the one schedule or the plurality of schedules in the schedule information 276 (SP9).

The inspection plan unit 21 transmits a registration completion notification for notifying that the one schedule or the plurality of schedules has been stored and the registration has been completed (SP10). When receiving the registration completion notification, the screen display unit 31 displays a registration completion screen indicating that the registration has been completed (SP11), and completes the schedule registration processing.

Figure 18:
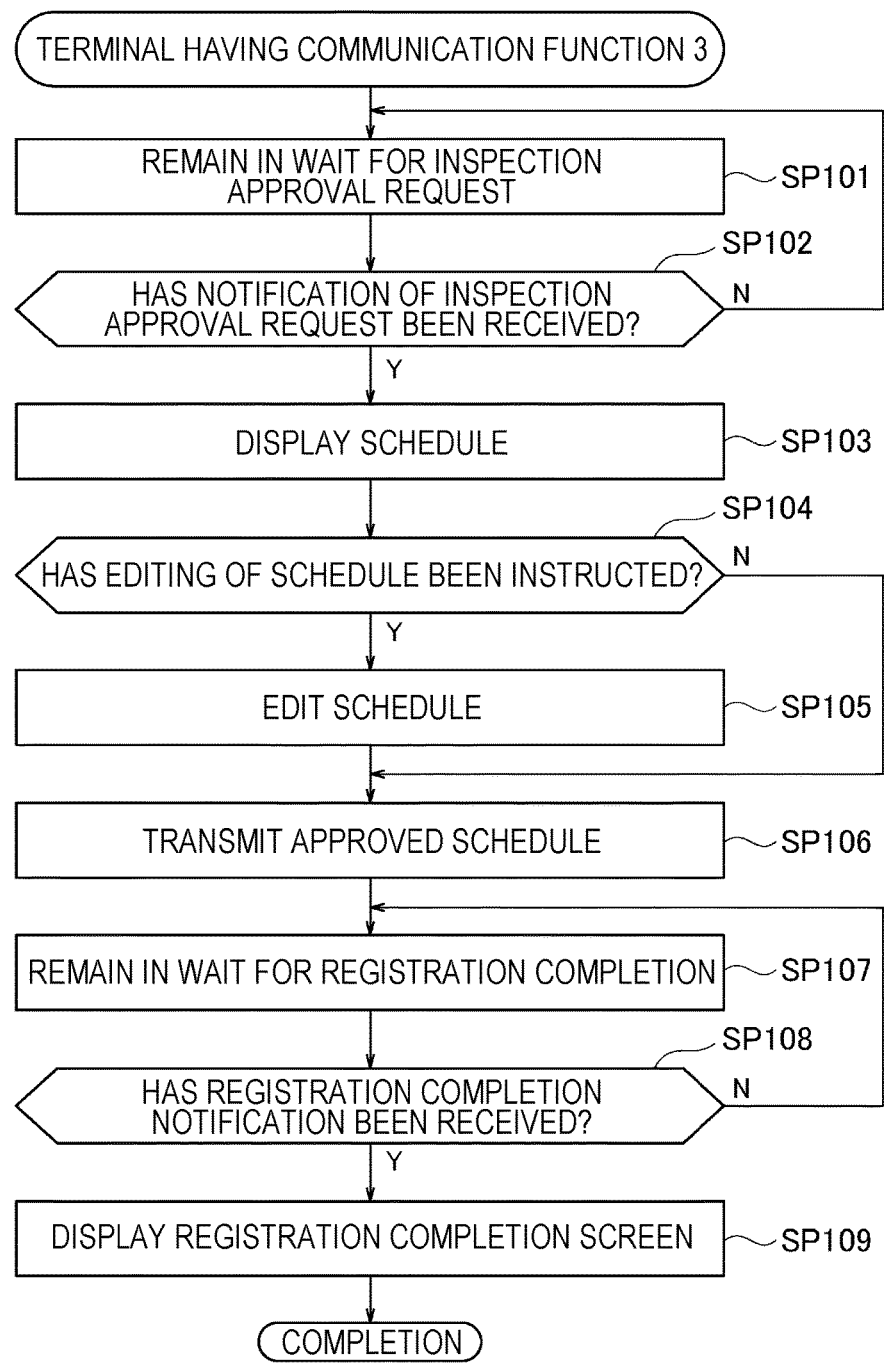
FIG. 18 is a flow chart of schedule registration processing on the side of a terminal having a communication function.

FIG. 18 illustrates detailed processing steps of the schedule registration processing on the side of the terminal having a communication function 3. Here, the detailed processing steps of the processing performed by the terminal having a communication function 3 during the schedule registration processing in FIG. 17, will be described.

In wait for the inspection approval request (SP101), the service performance confirmation unit 32 of the terminal having a communication function 3 determines whether the notification of the inspection approval request transmitted from the service providing server 2 has been received (SP102). When the service performance confirmation unit 32 acquires a negative result with the determination at step SP102, the processing proceeds to step SP101 so as to be on standby.

In contrast to this, when acquiring a positive result with the determination at step SP102, the service performance confirmation unit 32 transmits the ID and the password to the service providing server 2. After that, when receiving the notification of the schedule approval request from the service providing server 2, the service performance confirmation unit 32 displays the one schedule or the plurality of schedules together with the various types of information, on the display screen (SP103).

The service performance confirmation unit 32 determines whether editing operation of the user has instructed the editing of the one schedule or the plurality of schedules (SP104). When the service performance confirmation unit 32 acquires a negative result with the determination at step SP104, the processing proceeds to step SP106. When acquiring a positive result, the service performance confirmation unit 32 edits the one schedule or the plurality of schedules (SP105).

Next, the service performance confirmation unit 32 edits the one schedule or the plurality of schedules in a range of the performance period displayed on the performance period region 317, and approves the one schedule or the plurality of schedules by the press of the registration approval button 318. The service performance confirmation unit 32 transmits the approved one schedule or the approved plurality of schedules to the service providing server 2 (SP106).

In wait for the schedule registration completion (SP107), the service performance confirmation unit 32 determines whether the registration completion notification has been received (SP108). When the service performance confirmation unit 32 acquires a negative result with the determination at step SP108, the processing proceeds to step SP107. In contrast to this, when acquiring a positive result with the determination at step SP108, the service performance confirmation unit 32 displays the registration completion screen on the display screen (SP109), and then completes the schedule registration processing.

Figure 19:
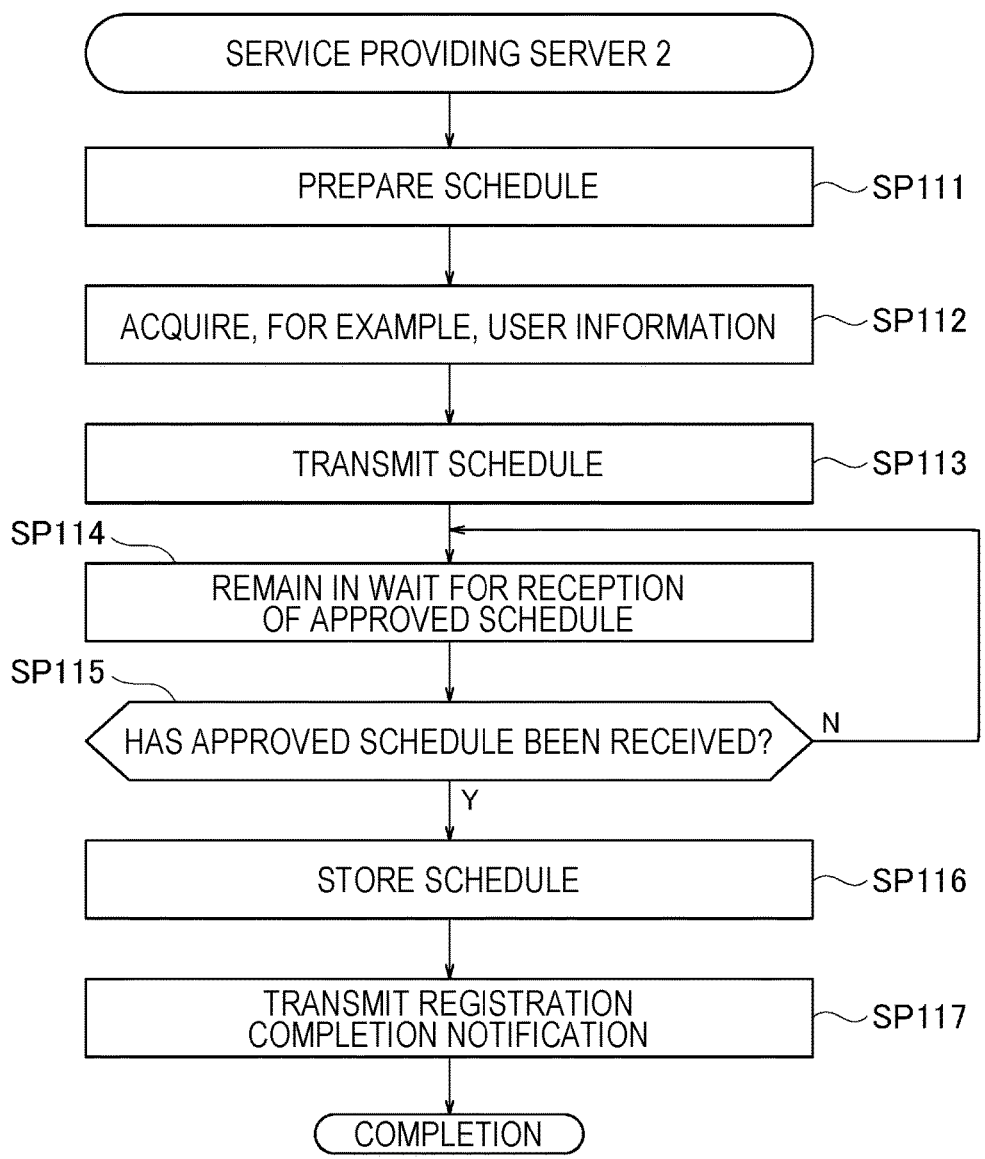
FIG. 19 is a flow chart of schedule registration processing on the side of a service providing sever.

FIG. 19 illustrates detailed processing steps of the schedule registration processing on the side of the service providing server 2. Here, the detailed processing steps of the processing performed by the service providing server 2 during the schedule registration processing in FIG. 17, will be described.

When completing the identification processing of the ID and the password transmitted from the terminal having a communication function 3, the inspection plan unit 21 of the service providing server 2 refers to the object-to-be-inspected ECU information 273 and prepares the one schedule or the plurality of schedules during the "inspection period" (SP111).

Next, the inspection plan unit 21 acquires the user information 271 and the object-to-be-inspected vehicle information 272 (SP112), and then transmits, for example, the user information 271 together with the prepared one schedule or the prepared plurality of schedules, to the terminal having a communication function 3 (SP113). Next, in wait for reception of the one schedule or the plurality of schedules approved in the terminal having a communication function 3 (SP114), the inspection plan unit 21 determines whether the approved one schedule or the approved plurality of schedules has been received (SP115).

When the inspection plan unit 21 acquires a negative result with the determination at step SP115, the processing proceeds to step SP114. In contrast to this, when acquiring a positive result with the determination at step SP115, the inspection plan unit 21 stores the received one schedule or the received plurality of schedules in the schedule information 276 (SP116). The inspection plan unit 21 transmits the registration completion notification to the terminal having a communication function 3 (SP117), and then completes the schedule registration processing.

Figure 20:
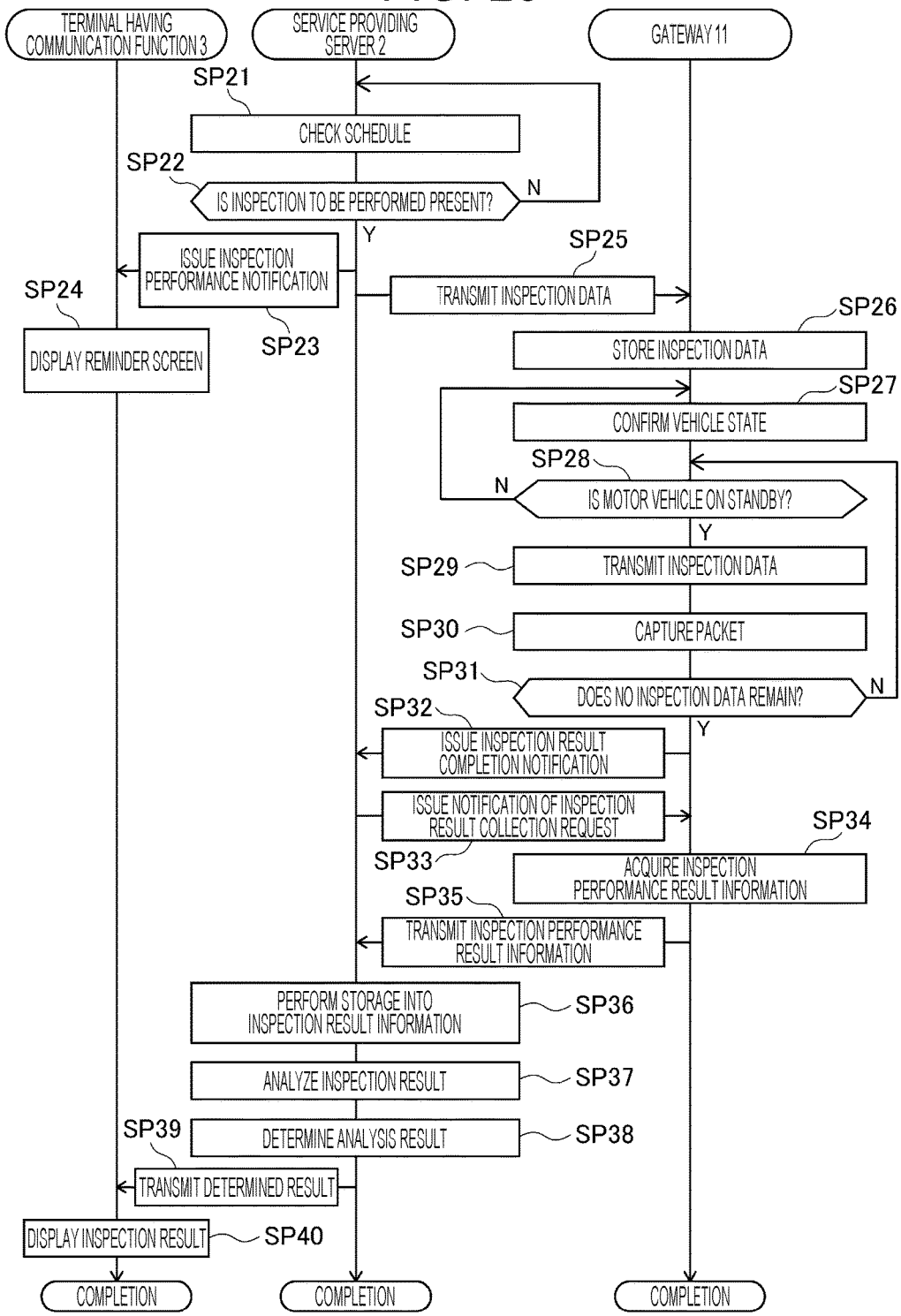
FIG. 20 is a flow chart of ECU inspection processing.

FIG. 20 illustrates a series of processing steps of ECU inspection processing. The ECU inspection processing is performed by the gateway 11 of the motor vehicle 1, the service providing server 2, and the terminal having a communication function 3.

First, the inspection control unit 22 of the service providing server 2 regularly or irregularly refers to the schedule information 276, and acquires "date and time" of an inspection schedule so as to check the one schedule or the plurality of schedules (SP21). Next, the inspection control unit 22 determines whether an inspection to be performed is present (SP22). When the inspection control unit 22 acquires a negative result, the processing goes back to step SP21. When the inspection control unit 22 acquires a positive result, the processing proceeds to step SP23.

Next, the inspection control unit 22 transmits an inspection performance notification to the terminal having a communication function 3 by the inspection data entry unit 24 (SP23). When receiving the inspection performance notification, the screen display unit 31 displays a reminder screen (SP24). Meanwhile, the inspection data entry unit 24 acquires inspection data from the security-check data information 274 and the operation-inspection data information 275, and transmits the acquired inspection data to the gateway 11 of the motor vehicle 1 being the object to be inspected (SP25).

When receiving the inspection data, the inspection performance control unit 111 of the gateway 11 stores the received inspection data in the inspection performance data information 1161 (SP26). Next, the inspection performance control unit 111 confirms a vehicle state of the motor vehicle 1 (SP27). In a case where the motor vehicle 1 is not on standby (SP28: N), the inspection performance control unit 111 determines that the state is not inspectable, and then the processing proceeds to step SP27.

Note that, on standby means that the motor vehicle 1 is in a stopped state and a certain period of time also has passed. In a state where the motor vehicle 1 is on standby (SP28: Y), the inspection performance control unit 111 acquires the inspection data stored in the inspection performance data information 1161, and the inspection performance unit 113 transmits the acquired inspection data to the ECUs 12 (SP29).

Next, the inspection performance control unit 111 acquires data output from the ECUs 12 by the inspection monitor unit 114, in particular, captures a packet (SP30), and stores the captured packet in the inspection performance result information 1162.

Next, the inspection performance control unit 111 confirms whether inspection data to be transmitted to the ECUs 12 remains in the inspection performance data information 1161 (SP31). In a case where the inspection data remains, the processing proceeds to step SP28. In a case where no inspection data remains, the processing proceeds to step SP32. Note that, in a case where the inspection has not been completed even when a certain period of time has passed, the service providing server 2 may be notified of a warning.

In a case where no inspection data to be transmitted to the ECUs 12 remains, the inspection performance control unit 111 transmits an inspection result completion notification indicating that the inspection has been completed, to the service providing server 2 (SP32). When receiving the inspection result completion notification, the inspection control unit 22 of the service providing server 2 transmits a notification of an inspection result collection request, to the gateway 11 by the inspection result collection unit 25 (SP33).

When receiving the notification of the inspection result collection request, the inspection information acquisition unit 112 of the gateway 11 acquires the inspection performance result information 1162 (SP34), and then transmits the acquired inspection performance result information 1162 to the service providing server 2 (SP35). When receiving the inspection performance result information 1162, the inspection result collection unit 25 of the service providing server 2 stores the inspection performance result information 1162 in the inspection result information 280 (SP36).

Next, the inspection result analysis unit 26 refers to the inspection result information 280 and the inspection collation result information 281, and compares an output result actually output from the ECUs 12 and an output result being estimated so as to analyze the inspection result information 280 (SP37), determines the analysis result (SP38), and stores the determined result in the inspection collation result information 281.

The inspection control unit 22 transmits the determined result to the terminal having a communication function 3 (SP39). Note that, the determined result may be transmitted to, for example, a dealer and a motor vehicle maker other than the terminal having a communication function 3. When receiving the determined result, the screen display unit 31 of the terminal having a communication function 3 displays the determined result, as an inspection result, on the display screen (SP40). As described above, the series of processing of the ECU inspection processing is completed.

Figure 21:
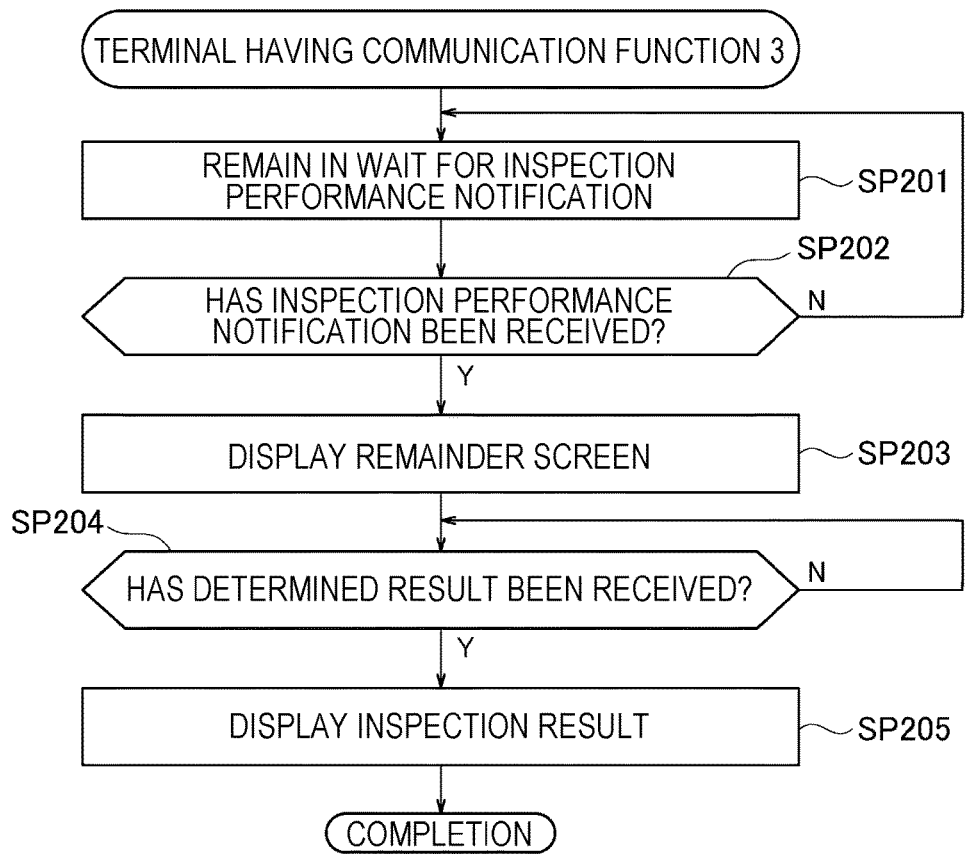
FIG. 21 is a flow chart of ECU inspection processing on the side of the terminal having a communication function.

FIG. 21 illustrates detailed processing steps of the ECU inspection processing on the side of the terminal having a communication function 3. Here, the detailed processing steps of the processing performed by the terminal having a communication function 3 during the ECU inspection processing in FIG. 20, will be described.

In wait for the inspection performance notification (SP201), the service performance confirmation unit 32 of the terminal having a communication function 3 determines whether the inspection performance notification transmitted from the service providing server 2 has been received (SP202). When the service performance confirmation unit 32 acquires a negative result with the determination at step SP202, the processing proceeds to step SP201.

In contrast to this, when acquiring a positive result with the determination at step SP202, the service performance confirmation unit 32 displays the remainder screen on the display screen (SP203). Next, the service performance confirmation unit 32 determines whether the determined result transmitted from the service providing server 2 has been received (SP204). When acquiring a negative result with the determination at step SP204, the service performance confirmation unit 32 remains on standby until the determined result is received.

In contrast to this, when acquiring a positive result with the determination at step SP204, the service performance confirmation unit 32 displays the inspection result on the display screen by the screen display unit 31 (SP205), and then completes the ECU inspection processing.

Figure 22:
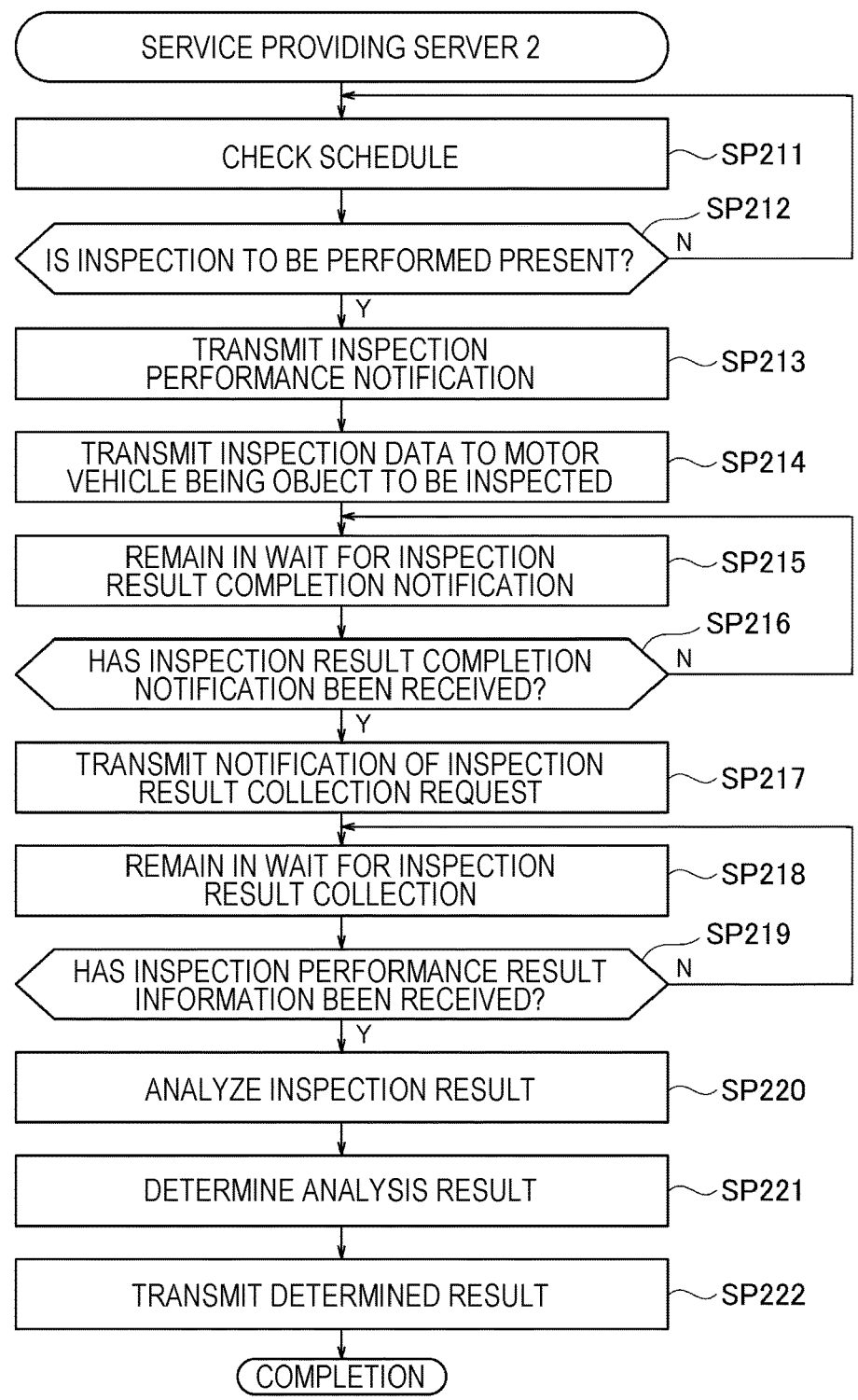
FIG. 22 is a flow chart of ECU inspection processing on the side of the service providing server.

FIG. 22 illustrates detailed processing steps of the ECU inspection processing on the side of the service providing server 2. Here, the detailed processing steps of the processing performed by the service providing server 2 during the ECU inspection processing in FIG. 20, will be described.

Based on an instruction from the inspection control unit 22, the inspection data entry unit 24 of the service providing server 2 regularly or irregularly refers to the schedule information 276, and acquires the "date and time" of the inspection schedule so as to check the one schedule or the plurality of schedules (SP211). The inspection data entry unit 24 determines whether the inspection to be performed is present (SP212).

When the inspection data entry unit 24 acquires a negative result with the determination at step SP212, the processing proceeds to step SP211. In contrast to this, when acquiring a positive result with the determination at step SP212, the inspection data entry unit 24 transmits the inspection performance notification to the terminal having a communication function 3 (SP213).

Next, the inspection data entry unit 24 acquires the inspection data from the security-check data information 274 and the operation-inspection data information 275, and transmits the inspection data to the gateway 11 of the motor vehicle 1 being the object to be inspected (SP214).

Next, in wait for the inspection result completion notification (SP215), the inspection control unit 22 determines whether the inspection result completion notification transmitted from the gateway 11 has been received (SP216). When the inspection control unit 22 acquires a negative result with the determination at step SP216, the processing proceeds to step SP215.

In contrast to this, when acquiring a positive result with the determination at step SP216, the inspection control unit 22 transmits the notification of the inspection result collection request, to the gateway 11 by the inspection result collection unit 25 (SP217). Next, in wait for the inspection result collection (SP218), the inspection result collection unit 25 determines whether the inspection performance result information 1162 transmitted from the gateway 11 has been received (SP219).

When the inspection result collection unit 25 acquires a negative result with the determination at step SP219, the processing proceeds to step SP218. In contrast to this, when acquiring a positive result with the determination at step SP219, the inspection result collection unit 25 stores the received inspection performance result information 1162 in the inspection result information 280.

The inspection result analysis unit 26 refers to the inspection result information 280 and the inspection collation result information 281, and compares the output result actually output from the ECUs 12 and the output result being estimated so as to analyze the inspection result (SP220). The inspection result analysis unit 26 determines no abnormality in a case where the output result is as estimated, and determines abnormality in a case where the output result is not as estimated (SP221).

The inspection control unit 22 transmits the determined result to the terminal having a communication function 3 (SP222) and then completes the ECU inspection processing.

Figure 23:
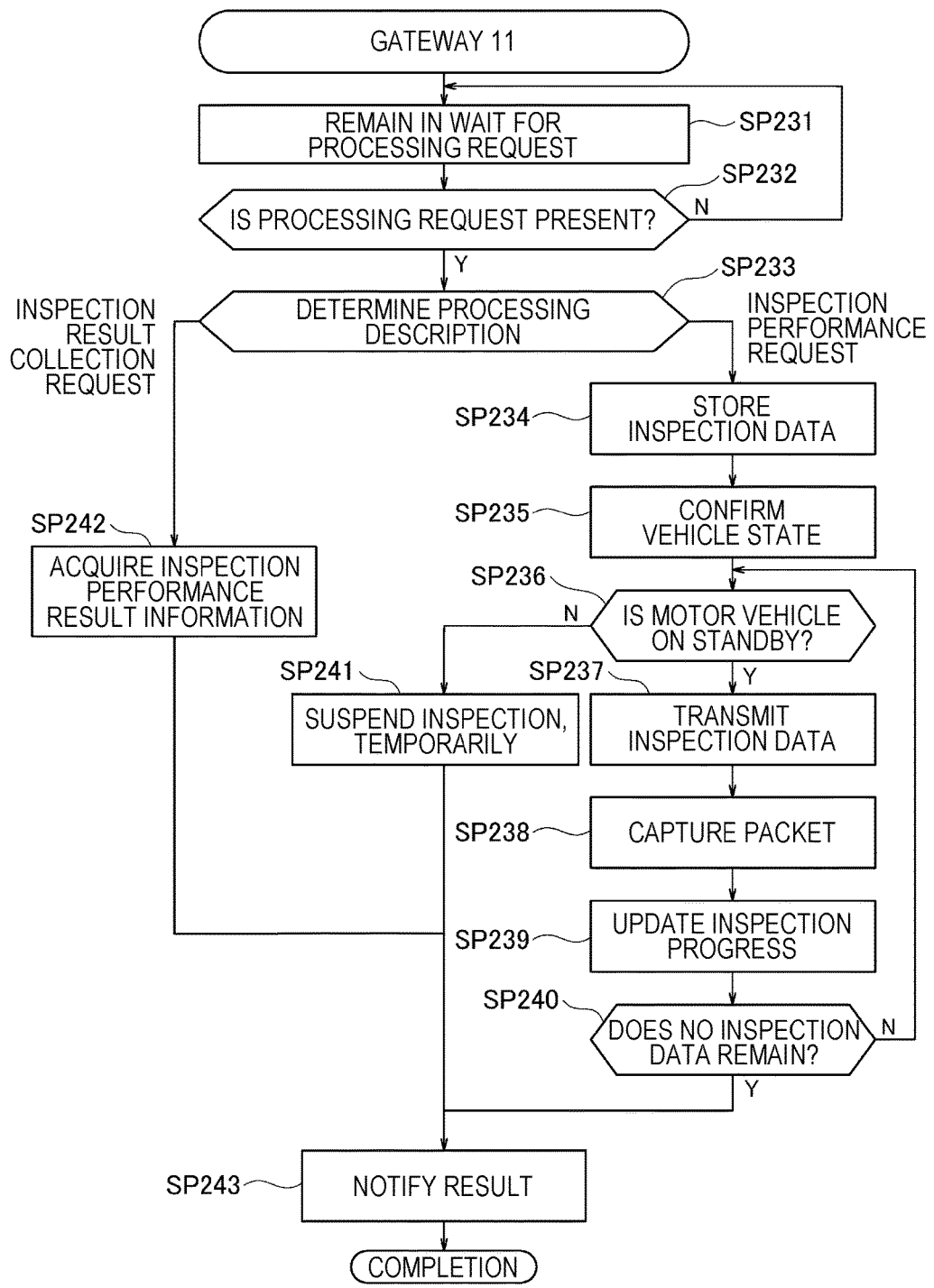
FIG. 23 is a flow chart of ECU inspection processing on the side of a gateway of a motor vehicle.

FIG. 23 illustrates detailed processing steps of the ECU inspection processing on the side of the gateway 11 of the motor vehicle 1. Here, the detailed processing steps of the processing performed by the gateway 11 during the ECU inspection processing in FIG. 20, will be described.

In wait for a processing request from the service providing server 2 (SP231), the inspection performance control unit 111 of the gateway 11 determines whether the processing request is present (SP232). When the inspection performance control unit 111 acquires a negative result with the determination at step SP232, the processing proceeds to step SP231. When acquiring a positive result, the inspection performance control unit 111 determines a processing description (SP233).

In a case where the processing description includes an inspection performance request, namely, in a case where the inspection data has been received from the service providing server 2, the inspection performance control unit 111 stores the received inspection data in the inspection performance data information 1161 (SP234). Next, the inspection performance control unit 111 confirms the vehicle state of the motor vehicle 1 (SP235), and determines whether the motor vehicle 1 is on standby (SP236).

In a case where the motor vehicle 1 is on standby (SP236: Y), the inspection performance control unit 111 generates a message corresponding to the CAN protocol, based on the "CAN-ID" and the "inspection data" of the inspection performance data information 1161, and transmits the generated message to the ECUs 12 by the inspection performance unit 113 (SP237).

Next, the inspection performance control unit 111 acquires the data output from the ECUs 12 by the inspection monitor unit 114, in particular, captures the packet, and stores the captured packet in the inspection performance result information 1162 (SP238). Next, the inspection performance control unit 111 updates the "progress" of the inspection performance data information 1161 to "completion" (SP239).

Next, the inspection performance control unit 111 refers to the "progress" of the inspection performance data information 1161 and confirms whether an item in which "completion" has not been made is present, so as to confirm whether inspection data to be transmitted to the ECUs 12 remains in the inspection performance data information 1161 (SP240).

When the inspection performance control unit 111 acquires a negative result with the determination at step SP240, the processing proceeds to step SP236. When acquiring a positive result, the inspection performance control unit 111 transmits the inspection result completion notification to the service providing server 2 (SP243), and then completes the ECU inspection processing.

Referring back to step SP236, in a case where the motor vehicle 1 is not on standby (SP236: N), the processing may wait until a standby state is made. However, the inspection temporarily suspends here (SP241), and a suspension notification indicating the suspension is transmitted to the service providing server 2 (SP243). Then, the ECU inspection processing is completed.

Referring back to step SP233, in a case where the processing description includes the inspection result collection request, namely, in a case where the notification of the inspection result collection request has been received from the service providing server 2, the inspection performance control unit 111 acquires the inspection performance result information 1162 by the inspection information acquisition unit 112 (SP242), transmits the inspection performance result information 1162 to the service providing server 2 (SP243), and then completes the ECU inspection processing.

Figure 24:
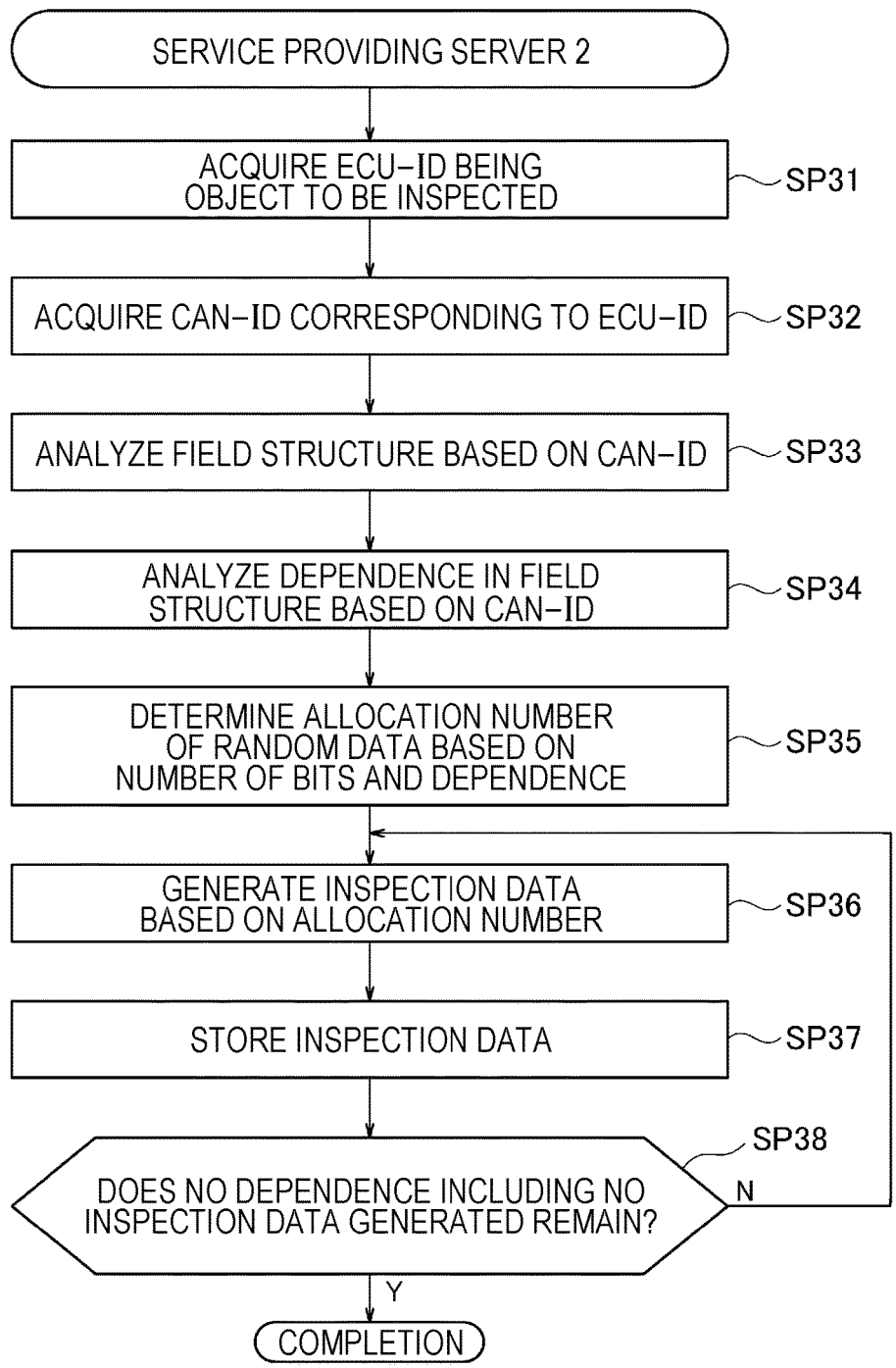
FIG. 24 is a flow chart of security-check data generation processing.

FIG. 24 illustrates processing steps of security-check data generation processing. The security-check data generation processing is performed by the service providing server 2 during the ECU inspection processing (refer to FIG. 20) or with arbitrary timing before the ECU inspection processing.

First, the inspection data generation unit 23 of the service providing server 2 refers to the object-to-be-inspected ECU information 273, and acquires "ECU-ID" including "target" in the "object-to-be-inspected flag" as ECU-ID being an object t to be inspected (SP31). Next, the inspection data generation unit 23 acquires "CAN-ID" corresponding to the ECU-ID specified as the object to be inspected (SP32).

Next, the inspection data generation unit 23 refers to the field structure information 277, and acquires "detailed field ID" and "the number of bits" corresponding to the CAN-ID acquired at step SP32 so as to analyze the field structure of the data field (refer to FIG. 15), by the field structure analysis unit 232 (SP33).

For example, the field structure analysis unit 232 refers to the field structure information 277, and acquires pieces of detailed field ID of "A1", "A2", "A3", and "A4" corresponding to the CAN-ID including "0x7E0" in a case where the CAN-ID acquired at step SP32 is "0x7E0".

The field structure analysis unit 232 acquires each of the number of bits of "8 bits", "8 bits", "16 bits", and "32 bits" corresponding to the pieces of detailed field ID of "A1" to "A4", respectively. As a result, the field structure analysis unit 232 can acquire an analysis result including the data field structure segmented into four, such as "A1" to "A4", and the respective segments being "8 bits", "8 bits", "16 bits", and "32 bits".

Note that, the field structure analysis unit 232 refers to the field structure information 277 so as to acquire pieces of segment ID of "D1", "D2", "D2", and "D4" corresponding to the pieces of detailed field ID of "A1" to "A4", respectively. The field structure analysis unit 232 refers to the field segment information 278 so as to acquire segment names of "significant digits", "variable data", and "dummy" corresponding to "D1", "D2", and "D4". As a result, a meaning indicated by the data stored in "A1" to "A4", can be analyzed.

Next, the inspection data generation unit 23 refers to the field dependence information 279 and acquires "detailed field dependence" corresponding to the CAN-ID acquired at step SP32, by the dependence analysis unit 231 (SP34).

For example, the dependence analysis unit 231 refers to the field dependence information 279, and acquires dependence of {A1, (A2 & A3), A4} corresponding to the CAN-ID of "0x7E0" in a case where the CAN-ID acquired at step SP32 is "0x7E0". In this case, there is dependence between the data stored in the segment of "A2" and the data stored in the segment of "A3".

Next, the inspection data generation unit 23 determines an allocation number of random data by the inspection data allocation unit 233, based on "the number of bits" acquired at step SP33 and the "detailed field dependence" acquired at step SP34 (SP35).

For example, the inspection data generation unit 23 allocates the random data to a position at which a more effective inspection can be achieved in the data field, in terms of inspection efficiency, instead of allocating the random data to all the data field totally including 64 bits. Here, since there is the dependence between "A2" and "A3", and "A2" and "A3" are "8 bits" and "16 bits", respectively, the inspection data generation unit 23 determines the allocation number of the random data to be 24 bits.

Note that, the inspection data generation unit 23 may determine the allocation number of the random data per dependence unit as described above, or may determine the allocation number of the random data in accordance with priority corresponding to characteristics of the "segment ID" of the field segment information 278. For example, the random data may be allocated to "A1" and fixed data may be allocated to "A2" to "A4".

Next, based on the allocation number of the data determined at step SP35, the inspection data generation unit 23 determines a range in which the random data is used, and generates inspection data by the inspection data allocation unit 233 (SP36). The inspection data generation unit 23 stores the generated data in the security-check data information 274 (SP37).

Next, the inspection data generation unit 23 determines whether dependence including no inspection data generated remains in the dependence acquired at step SP34 (SP38). When the inspection data generation unit 23 acquires a negative result with the determination at step SP38, the processing proceeds to step SP36. When receiving a positive result, the inspection data generation unit 23 completes the security-check data generation processing.

(6) Effect According to the Present Embodiment

As described above, the inspection system 5 according to the present embodiment, transmits the security-check data considered not to be received by the ECUs 12 at the design stage of the ECUs 12, to the ECUs 12, together with the operation-inspection data previously prepared at the design stage of the ECUs 12, and determines whether the data output from the ECUs 12 is in a proper range. Therefore, the operation of the ECUs 12 during the use can be accurately inspected.

(7) Another Embodiment

According to the present embodiment described above, the inspection result analysis unit 26 of the service providing server 2 refers to the inspection result information 280 and the inspection collation result information 281, analyzes the inspection result information 280, and determines the analysis result (refer to SP37 and SP38 in FIG. 20). However, the present embodiment is not limited to this. A gateway 11 of a motor vehicle 1 may include an inspection result analysis unit 26 and inspection collation result information 281. The gateway 11 may refer to inspection performance data information 1161 and the inspection collation result information 281, may analyze the inspection performance data information 1161, and may determine the analysis result, by the inspection result analysis unit 26.

Figure 25:
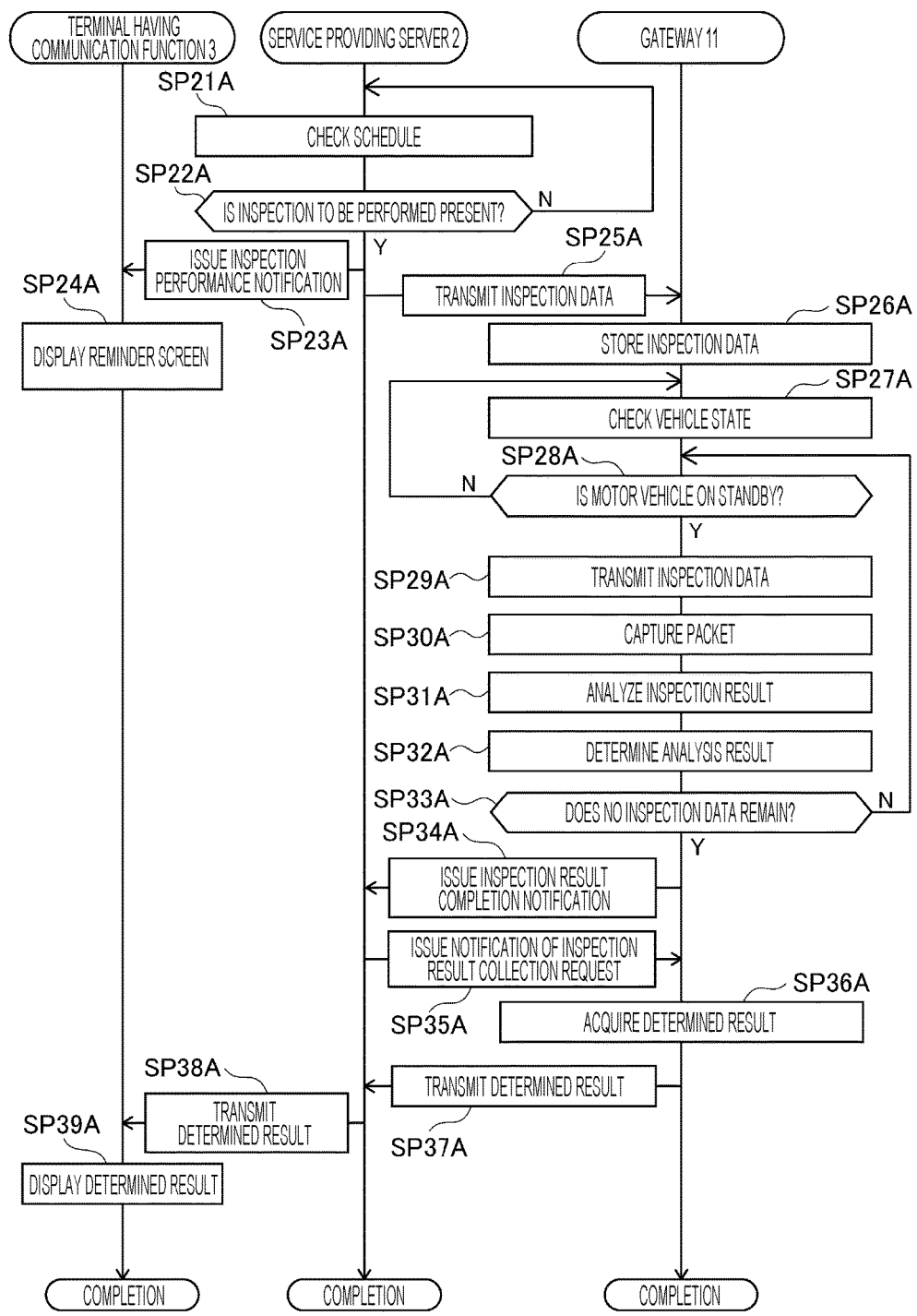
FIG. 25 is a flow chart of ECU inspection processing in a case where a gateway analyzes an inspection result.

FIG. 25 illustrates processing steps of ECU inspection processing according to another embodiment. The ECU inspection processing according to the other embodiment is different from the ECU inspection processing according to the present embodiment described above (FIG. 20) in that the gateway 11 analyzes an inspection result (SP31A) and determines the analysis result (SP32A) and in that the gateway 11 acquires the determined result (SP36A) and transmits the determined result to a service providing server 2 (or directly to a terminal having a communication function 3) (SP37A).

REFERENCE SIGNS LIST

1 motor vehicle
2 service providing server
3 terminal having a communication function
4 communication network
5 inspection system

The invention claimed is:

1. An inspection apparatus configured to inspect operation of an ECU coupled to automotive networks, the inspection apparatus comprising:
   an inspection performance control unit configured to transmit two pieces of data including operation-inspection data and security-check data used for inspecting the operation of the ECU, to the ECU, and configured to receive data output from the ECU,
   wherein the operation-inspection data is data previously generated based on design information of the ECU,
   the security-check data is data including part or entirety of the operation-inspection data replaced with random data, and
   reception of the operation-inspection data and the security-check data at the ECU is configured to cause the ECU to operate according to the operation-inspection data and the security-check data and to output inspection data.

2. The inspection apparatus according to claim 1,
   wherein the inspection performance control unit receives the operation-inspection data and the security-check data from an external terminal, and transmits inspection performance result information including the inspection data output from the ECU, to the external terminal.

3. The inspection apparatus according to claim 1, further comprising:
   estimate output data estimated to be output from the ECU in a case where the security-check data is transmitted to the ECU,
   wherein the inspection performance control unit compares the inspection data output from the ECU and the estimated output data, analyzes the inspection data output from the ECU, determines whether the operation of the ECU is normal, based on an analysis result, and inspects the operation of the ECU.

4. The inspection apparatus according to claim 3,
   wherein the inspection performance control unit transmits an inspection result of the operation of the ECU, to an external terminal.

5. The inspection apparatus according to claim 1,
   wherein the inspection performance control unit confirms a vehicle state of a motor vehicle including the ECU, and, only in a case where the vehicle state is on standby, transmits the two pieces of data including the operation-inspection data and the security-check data, to the ECU.

6. An inspection system configured to inspect operation of an ECU coupled to automotive networks, the inspection system comprising:
   a service providing server including:
      an inspection plan unit configured to plan a schedule for inspecting the operation of the ECU;
      an inspection data generation unit configured to generate two pieces of data including operation-inspection data and security-check data used for inspecting the operation of the ECU; and
      an inspection control unit configured to transmit the generated two pieces of data to an exterior in accordance with the planned schedule; and
   a gateway configured to transmit, in a case where the two pieces of data including the operation-inspection data and the security-check data transmitted from the service providing server, are received, the received two pieces of data to the ECU, and the gateway is further configured to transmit, in a case where inspection data output from the ECU is received, inspection performance result information including the received inspection data to the service providing server, wherein the operation-inspection data is data previously generated based on design information of the ECU, the security-check data is data including part or entirety of the operation-inspection data replaced with random data, and reception of the operation-inspection data and the security-check data at the ECU is configured to cause the ECU to operate according to the operation-inspection data and the security-check data and to output inspection data.

7. The inspection system according to claim 6, wherein the service providing server is configured to:

estimate output data estimated to be output from the ECU in a case where the security-check data is transmitted to the ECU; and an inspection result analysis unit configured to compare, in a case where the inspection performance result information transmitted from the gateway is received, the inspection data output from the ECU included in the received inspection performance result information and the estimate output data, analyze the inspection data output from the ECU, and determine whether the operation of the ECU is normal, based on an analysis result, and configured to inspect the operation of the ECU.

8. The inspection system according to claim 6, wherein the service providing server includes:

field structure information indicating correspondence between CAN-ID being identification information of the automotive networks to which the ECU belongs and a plurality of detailed fields being constituent elements of a data field storing the security-check data; and field dependence information indicating correspondence between the CAN-ID and dependence of the detailed fields, wherein, when generating the security-check data, the inspection data generation unit refers to the field structure information, analyzes structures of the detailed fields, specifies segments of the detailed fields, refers to the field dependence information, specifies dependence of the segments of the detailed fields, allocates and stores the random data into any or entirety of the detailed fields based on the specified segments of the detailed fields and the specified dependence of the segments, and generates the security-check data.

9. The inspection system according to claim 6, further comprising:

a terminal having a communication function, wherein the service providing server transmits the inspection result to the terminal having a communication function.

10. An inspection method of inspecting operation of an ECU coupled to automotive networks, the inspection method comprising:

a first step of planning a schedule for inspecting the operation of the ECU, by an inspection plan unit;

a second step of generating two pieces of data including operation-inspection data and security-check data used for inspecting the operation of the ECU, by an inspection data generation unit;

a third step of transmitting the generated two pieces of data to an exterior, by an inspection control unit, in accordance with the planned schedule;

a fourth step of transmitting by a gateway, in a case where the two pieces of data including the operation-inspection data and the security-check data transmitted from a service providing server, are received, the received two pieces of data to the ECU; and a fifth step of transmitting inspection performance result information including inspection data received from the ECU to the service providing server, wherein the operation-inspection data is data previously generated based on design information of the ECU, the security-check data is data including part or entirety of the operation-inspection data replaced with random data, and reception of the operation-inspection data and the security-check data at the ECU is configured to cause the ECU to operate according to the operation-inspection data and the security-check data and to output the inspection data.

11. The inspection method according to claim 10, further comprising:

a fifth step of inspecting the operation of the ECU, in a case where the inspection performance result information transmitted from the gateway is received, by comparing the inspection data output from the ECU included in the received inspection performance result information and estimate output data, analyzing the inspection data output from the ECU, and determining whether the operation of the ECU is normal, based on an analysis result, wherein the service providing server generates the estimated output data to be output from the ECU in a case where the security-check data is transmitted to the ECU.

12. The inspection method according to claim 10, further comprising:

a sixth step of generating the security-check data, in a case where the security-check data is generated, by referring to field structure information, analyzing structures of detailed fields, specifying segments of the detailed fields, referring to field dependence information, specifying dependence of the segments of the detailed fields, and allocating and storing the random data into any or entirety of the detailed fields based on the specified segments of the detailed fields and the specified dependence of the segments, by the inspection data generation unit, wherein the service providing server includes:

the field structure information indicating correspondence between CAN-ID being identification information of the automotive networks to which the ECU belongs and the plurality of detailed fields being constituent elements of a data field storing the security-check data; and the field dependence information indicating correspondence between the CAN-ID and the dependence of the detailed fields.

13. The inspection method according to claim 10, further comprising:

a seventh step of transmitting the inspection result to a terminal having a communication function by the service providing server.

* * * * *